United States Patent [19]

Boosalis, deceased et al.

[11] 4,440,071

[45] Apr. 3, 1984

[54] CONVEYOR SYSTEM FOR SKEWERED FOODS

[75] Inventors: Michael G. Boosalis, deceased, late of Fayetteville, N.C., by Frieda Boosalis, administratrix; George M. Boosalis, Fayetteville; Wayne Ferrin, Sanford, both of N.C.

[73] Assignee: Frieda Boosalis, Fayetteville, N.C.

[21] Appl. No.: 380,767

[22] Filed: May 21, 1982

[51] Int. Cl.³ .................................................. A47J 37/04
[52] U.S. Cl. ........................................ 99/339; 99/420; 99/427; 99/443 C; 221/150 A
[58] Field of Search ................... 99/357, 420, 421 R, 99/421 H, 421 P, 441, 443 C, 339; 221/150 A, 150 HC

[56] References Cited

U.S. PATENT DOCUMENTS

| 1,638,452 | 8/1927 | Panajiotaros et al. | 99/420 X |
| 2,142,390 | 1/1939 | Zerr | 99/441 X |
| 2,465,611 | 3/1949 | Singer | 99/421 P |
| 3,734,740 | 5/1973 | Zenos | 99/443 C |
| 4,034,661 | 7/1977 | Boosalis et al. | 99/420 X |

FOREIGN PATENT DOCUMENTS 469456 7/1975 U.S.S.R. .............................. 99/421 P

Primary Examiner—Billy J. Wilhite
Assistant Examiner—Christine A. Peterson
Attorney, Agent, or Firm—Holman & Stern

[57] ABSTRACT

The invention comprises an endless conveyor system having particular application in an apparatus of the type wherein raw foods are conveyed past a cooking element and subsequently dispensed as a cooked product. The conveyor system comprises endless conveyor means including receiving brackets for receiving and retaining foodstuffs to be conveyed, and rotation means for imparting even rotational movement to the foodstuffs as they are conveyed past the cooking element to ensure a well-cooked palatable product. The conveyor system is particularly adapted for use with skewered foods.

6 Claims, 13 Drawing Figures

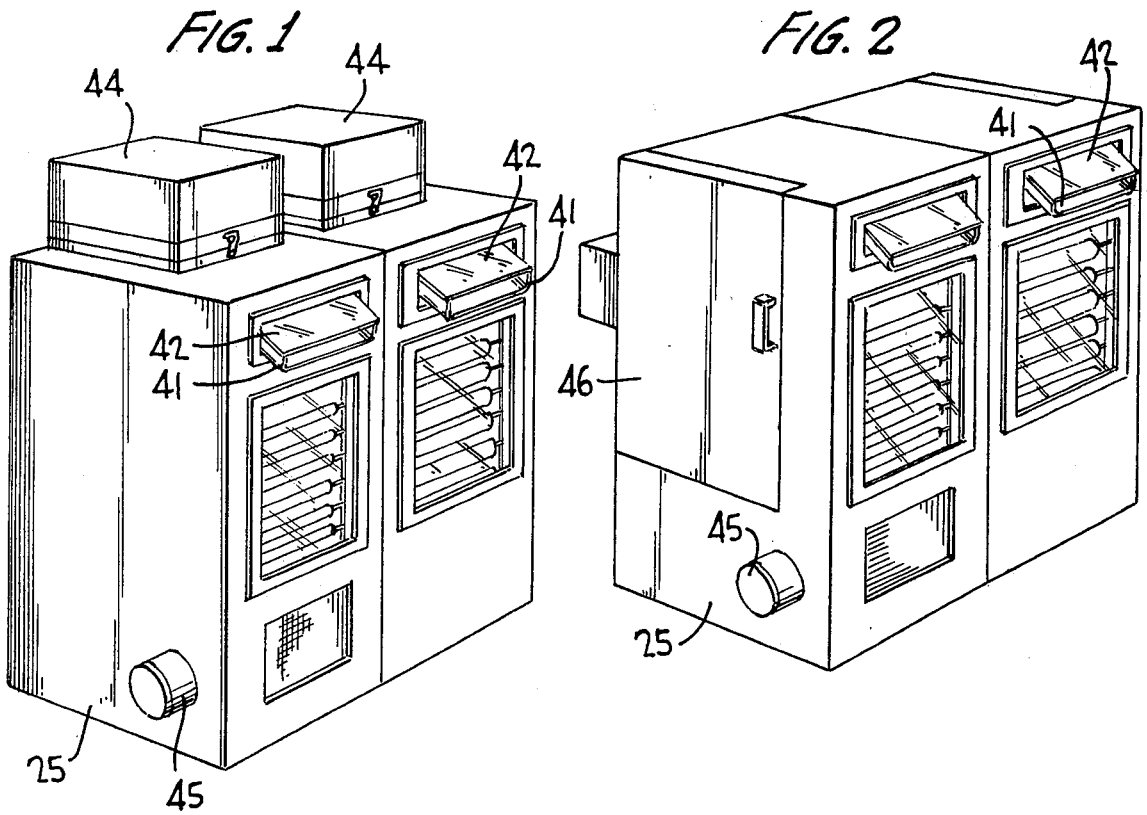
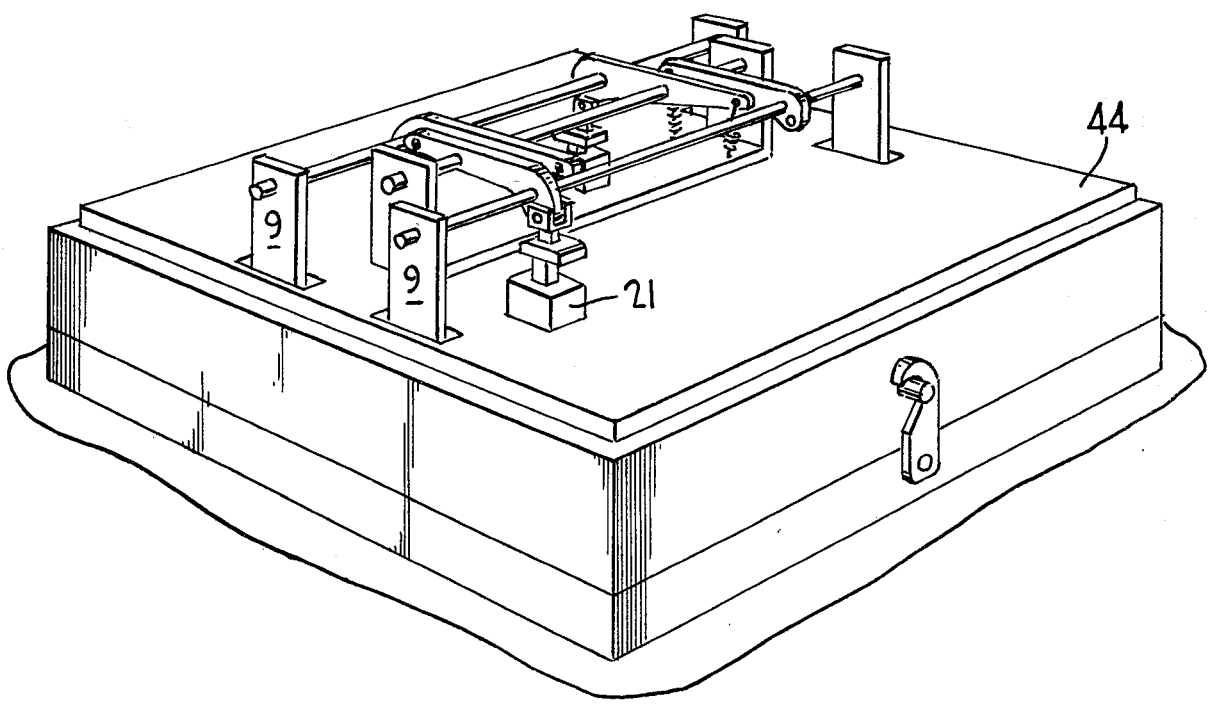

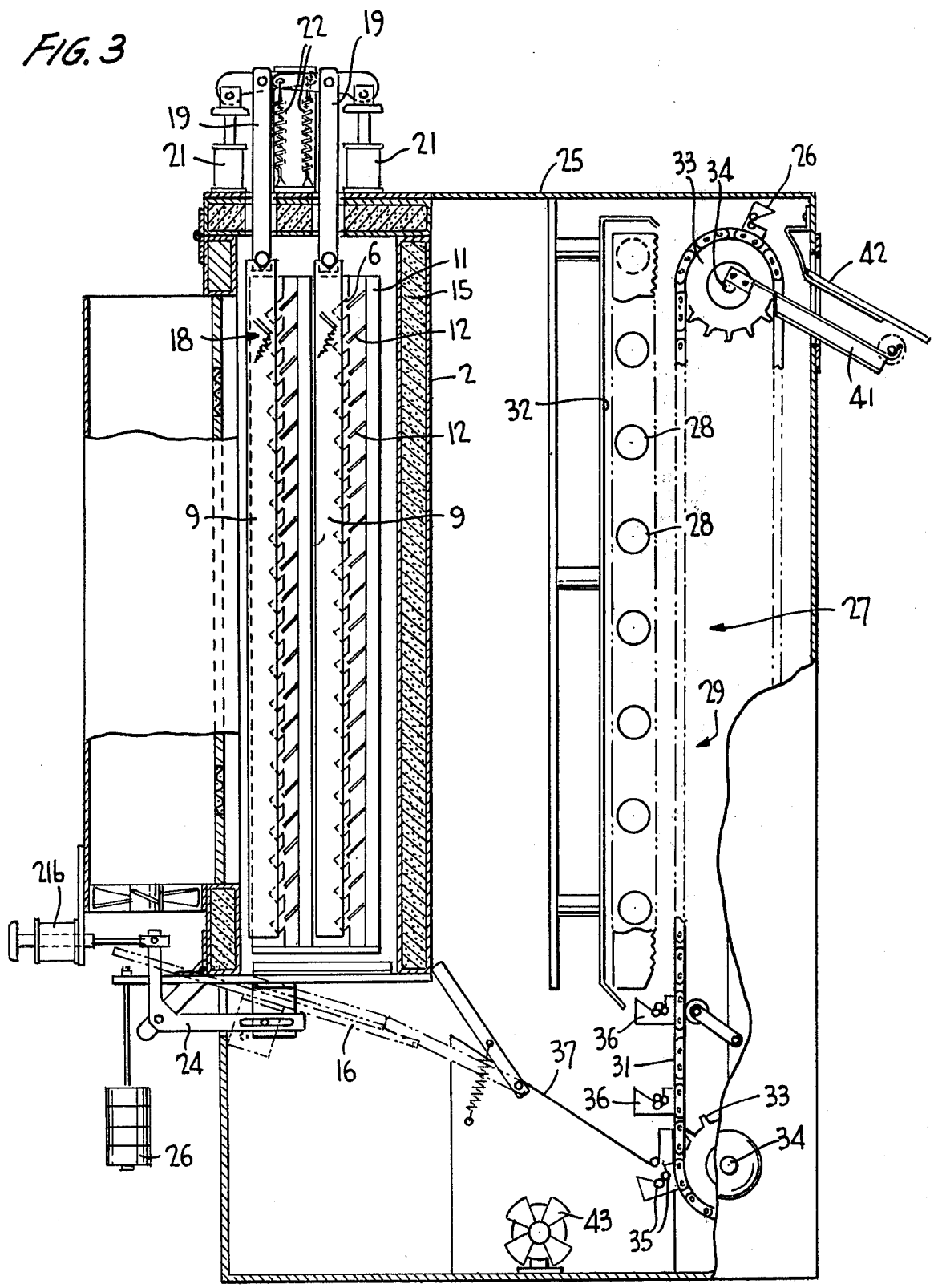

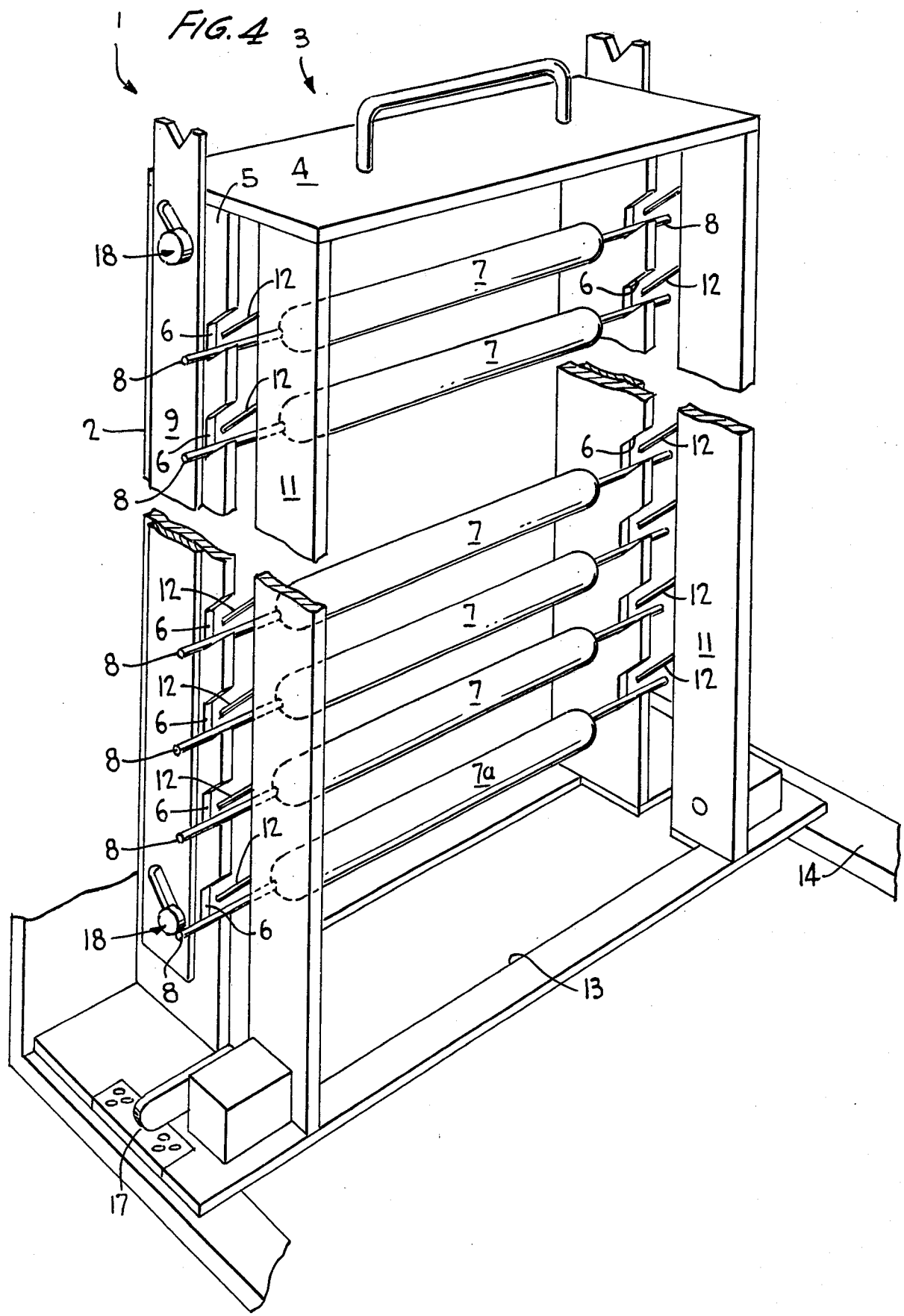

CONVEYOR SYSTEM FOR SKEWERED FOODS

BACKGROUND OF THE INVENTION

Apparatus of the type useful for sequentially dispensing food items to be cooked to a cooking unit are well known in the art. Such apparatus have particular application in short-order vending operations, particularly coin-operated vending machines of the type employing an endless belt to convey dispensed raw food past a cooking element. Difficulties have been encountered, however, in the practical use of such apparatus, both with respect to the dispensing means and the endless belt systems employed to convey the food for cooking. Owing to the great variability in the physical characteristics of different foods, dispensing units have been typically restricted to dispensing only one type of foodstuff, characteristically hot dogs and accompanying buns. Even then, the nonuniform characteristics of the same type of foodstuff have resulted in irregular and unreliable operation of many prior art dispensers. Additionally, it has been necessary to develop specialized endless belt conveyor systems for use in conjunction with the cooking of specific foodstuffs, again owing to non-uniformity between different types of foods. Known conveyor systems for foods such as hot dogs are typically prone to result in a poorly cooked product, most usually overdone on one side and underdone on the opposite side. Frequently, it has been difficult to develop dispensing apparatus compatible with conveyor systems specifically designed for use with a certain type of foodstuff.

Accordingly, the invention provides an endless conveyor system for both food and non-food items, but particularly for conveying skewered raw food items past a cooking assembly and for manipulating the food during transport to insure proper cooking and a palatable product. Owing to the uniformity of the skewers employed, a wide variety of disparate food items can be reliably conveyed and manipulated, including many food items not previously adaptable to an automated system.

SUMMARY OF THE INVENTION

The invention comprises a cooking assembly including an endless conveyor system for the simultaneous conveyance and rotation of articles, particularly skewered foods. The conveyor system comprises endless conveyor means and rotation means for conveying and rotating articles, especially for conveying skewered foods past a cooking element to a product discharge outlet, with simultaneous rotation to ensure even exposure to the elements. The conveyor system of the invention includes a pair of vertically disposed endless belts driven by sprocket wheels in a conventional manner. Each belt includes a plurality of receiving brackets extending from the outer surface thereof; each of the bracket is horizontally aligned with a corresponding bracket on the opposing belt for receiving the free ends of a skewer to thereby convey the skewered food. The brackets are sufficiently angled to retain the skewers, and are provided with bearing means in the vertex of the angle, upon which the skewer bears to permit facile rotational movement of the skewer in the bracket. The rotation means of the invention comprises means for imparting rotational movement to the skewers lodged in the brackets such as a rack gear disposed for interaction with the skewers as they are conveyed by the conveying means; the rack gear acts in cooperation with biasing means for urging the skewers against the gear teeth, for example a spring biased roller arm acting against the endless belt conveyor. The skewers are thus pressed between the gear teeth and the bracket bearing means, resulting in even rotational movement of the skewers as they are moved along by the endless belt.

BRIEF DESCRIPTION OF THE DRAWINGS

In the Drawings:

FIG. 1 is a perspective view of a combined dispensing and cooking apparatus according to the invention;

FIG. 2 is a view similar to FIG. 1 of an ternate embodiment of the combined dispensing and cooking apparatus;

FIG. 3 is a cross-sectional side view of the combined dispensing and cooking apparatus of FIG. 1;

FIG. 4 is a perspective view of an embodiment of the dispenser of the apparatus of FIG. 3;

FIG. 13 is a perspective view of the actuating mechanism of the apparatus of FIG. 1.

DETAILED DESCRIPTION OF THE INVENTION

Figure 5:
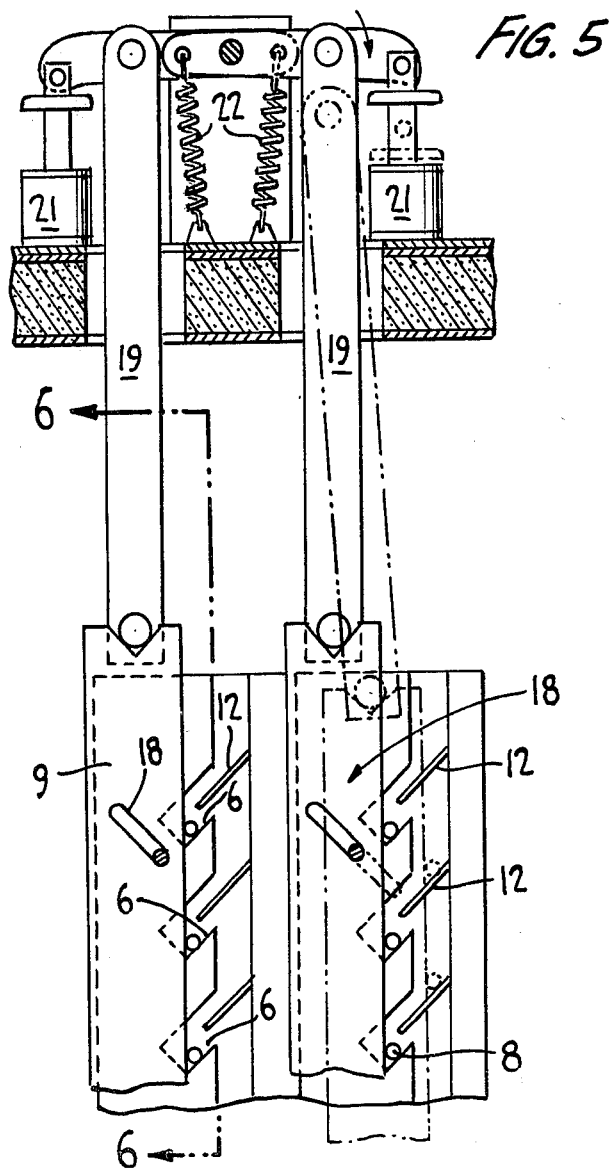
FIG. 5 is a partial detail of the dispenser of the apparatus of FIG. 3.

In a particularly contemplated embodiment of the invention, a dispenser which is the subject of a copending U.S. patent application Ser. No. 06/380768 filed on May 21, 1982 by Wayne Ferrin for "Dispenser for Skewered Foods", is employed in conjunction with the endless conveyor system of the invention.

With particular reference to FIG. 4, the dispenser, generally indicated at 1, comprises a housing 2 for a removable dispensing cartridge 3 adapted for storing and feeding the articles to be dispensed. The cartridge 3 includes a frame 4 having a first pair of vertical side members 5 including a plurality of support means comprising horizontally aligned notches 6 for supporting the articles to be dispensed in vertical relationship within the cartridge 3. In the illustrated embodiment, the articles to be dispensed comprise food items such as hot dogs 7 supported in notches 6 by skewers 8. In addition to the hot dogs 7, however, the dispenser 1 is useful for dispensing a large variety of both food and non-food items, but is particularly useful for skewered foods including those commonly served en brochette, such as kabobs.

Figure 11:
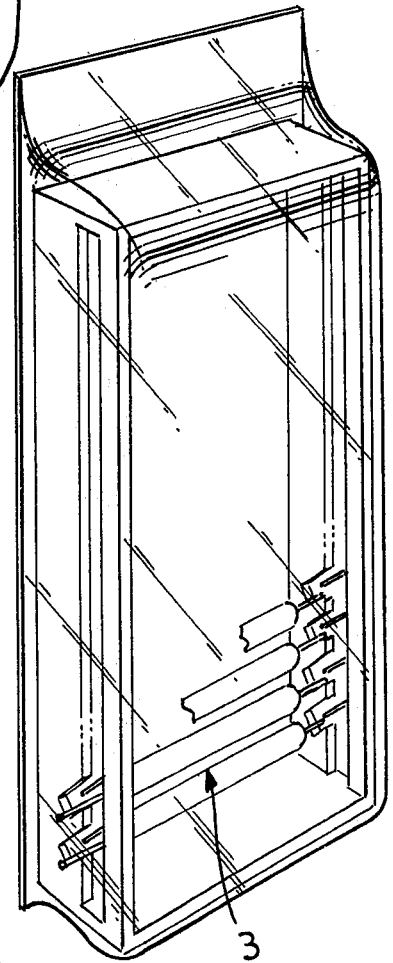
FIG. 11 is a perspective view of the dispensing cartridge of the invention, packaged for sale.

The cartridge 3 further includes guide means for guiding the skewers 8 holding the hot dogs 7 to the next subjacent notches 6 as the skewers 8 are displaced during the dispensing process, as by a push bar 9. The guide means exemplified comprise a second pair of vertical side members 11 in the frame 4 having vertically disposed pins 12 corresponding with, and extending into the notches 6. As the push bar 9 is operated, the skewers 8 are dislodged from the notches 6 and drop on to the subjacent pins 12, which guide them into the corresponding subjacent notches 6, or, in the case of the lowermost hot dog 7a, through a discharge outlet 13 in the cartridge 3. The outlet 13 communicates with discharge means in the housing 2 comprising an opening 14 in the floor of the housing 2. The housing 2 is optionally refrigerated, and in this event, the opening 14 is provided with a door 16, and the housing 2 is insulated with insulating material 15, as best seen in FIG. 3. The cartridge 3 may be supplied for disposition in the housing 2 as a disposable filled "blister pack" as shown in FIG. 11, or may be intended for reuse, in which case means such as hinge 17 (FIG. 4) are included to permit the pairs of vertical side members 5 and 11 to be separated so that the cartridge 3 may be refilled.

Figure 6:
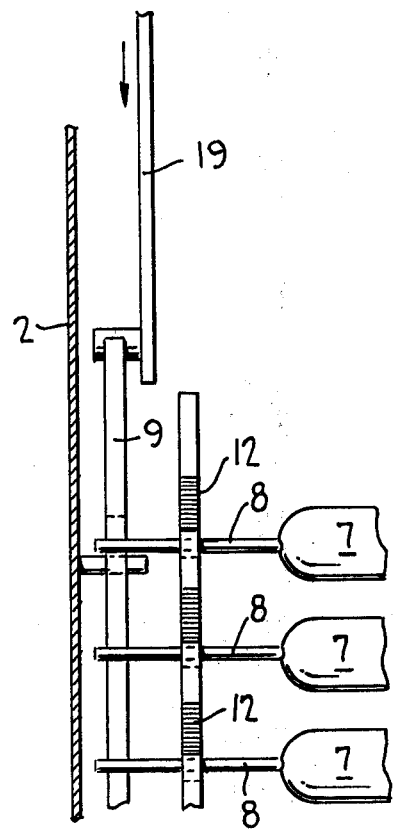
FIG. 6 is a view along the lines 6—6 of FIG. 5.
Figure 9:
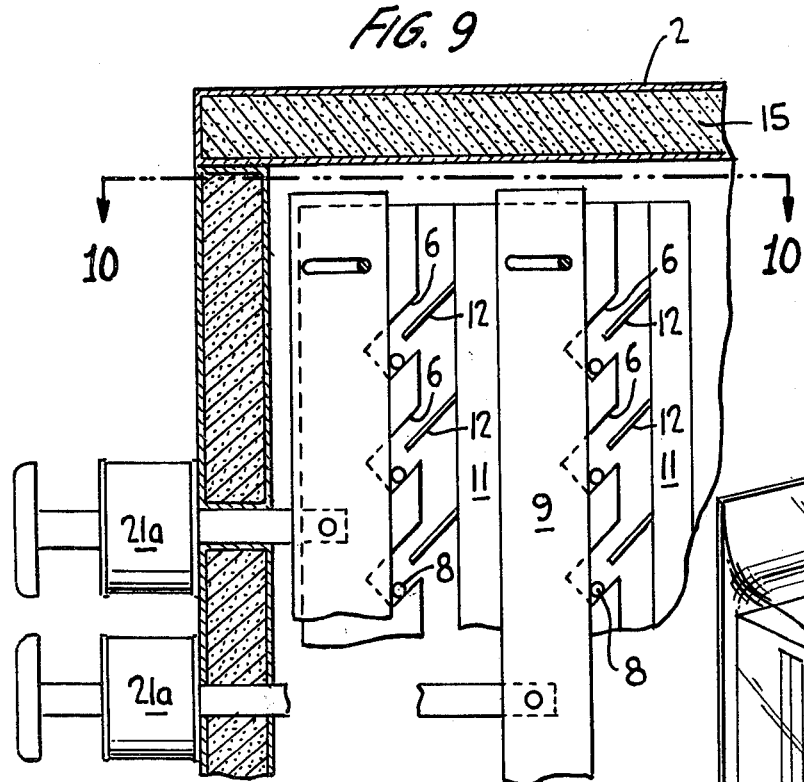
FIG. 9 is a cross-section partial detail of the dispenser of the apparatus of FIG. 2.
Figure 10:
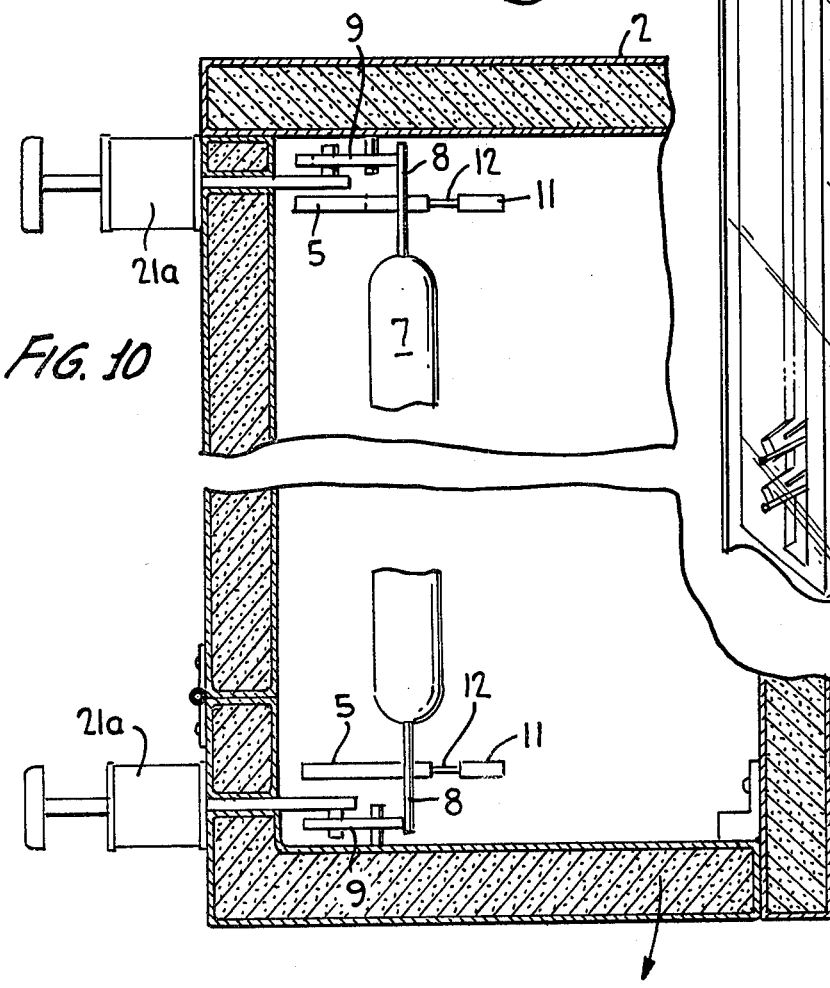
FIG. 10 is a view along the line 10—10 of FIG. 9.

The displacing means comprising push bar 9 may be associated with the cartridge 3, as shown in FIG. 4, or more preferably, associated with the housing 2. In a preferred embodiment, illustrated in detail in FIGS. 5 and 6, the push bars 9 include a pin and slot mechanism 18 for translating downward motion from associated levers 19 into horizontal motion of the push bars 9 so that the skewers 8 are displaced from the notches 6. Preferably, the levers 19 are actuated by actuating means such as lever solenoids 21 to move from the position indicated by solid lines to the position indicated by dotted lines; the levers 19 are retracted to their original position by countersprings 22. In an alternate embodiment shown in FIGS. 9 and 10, the push bars 9, guided by a pin and slot mechanism 18a, are displaced horizontally by levers 19a, preferably actuated by lever solenoids 21a. The levers 19 and 19a are either secured to the push bars 9 so that the push bars automatically return to their original positions as the levers are retracted, or the push bars 9 are biased towards the inoperative position by biasing means such as biasing spring 23 shown in FIG. 4. Both the push bars 9 and the door 16 to the discharge opening 14 in the housing 2 may be manually operated, if desired. However, for commercial vending operations, both mechanisms are preferably automatically actuated. As best shown in FIG. 3, the door 16 is conveniently operated by actuation of a linkage 24 by door solenoid 21b and closed by the action of a counterweight 26.

The dispenser 1 or a similarly useful conventional dispenser may be employed for dispensing food to be cooked, particularly skewered food, to a cooking assembly including the endless conveyor system of the invention. Typically, the dispenser and cooking assembly are disposed in a combined dispensing and cooking apparatus of the type illustrated in FIGS. 3 and 8, wherein skewered food discharged from the dispenser 1 is conveyed by endless conveyor means past a series of cooking elements to a discharge outlet. The endless conveyor system of the invention may be used independently in other applications, however.

Figure 7:
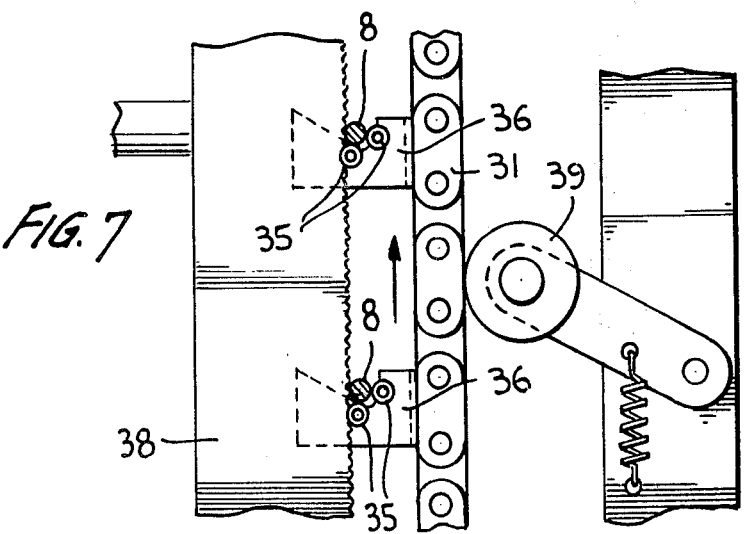
FIG. 7 is a partial detail of the conveyor system of the apparatus of FIG. 3.

With particular reference to FIG. 3, the inventive embodiment comprises a cooking assembly generally indicated at 27 disposed in a common housing 25 with dispenser 1. The cooking assembly 27 includes a vertical array of cooking elements such as infrared lamps 28 disposed in a parallel plane to the dispensing cartridge 3, and an endless conveyor system including endless belts 31 of the chain link type (only one of which is shown) disposed parallel to the vertical array of cooking elements 28. Preferably, the cooking elements 28 are associated with reflecting means for reflecting heat toward the belt 31 and the food it carries, comprising a polished reflector 32 of known type. The belts 31 are driven by spaced sprocket wheels 33 supported on shafts 34 which extend between opposite side walls of the common housing 25. (Each shaft carries two sprocket wheels 33, but only one is illustrated on each shaft, exemplifying the interaction between the belts 31 and the associated sprocket wheels 33.) The sprocket wheels are in turn driven in a conventional manner as by an electric motor associated with a usual drive shaft or chain and associated gearing system (not shown). Preferably, the motor is of the variable speed type, to permit regulation of chain speed and hence cooking time. As best seen in FIGS. 3 and 7, each belt 31 includes spaced receiving means for receiving and carrying food from dispenser 1, comprising a plurality of brackets 36 extending from the face of each belt 31. Each bracket 36 is horizontally aligned with a corresponding bracket on the opposing belt (not shown) which are adapted to receive and carry the free ends of the skewers 8 piercing the food articles discharged from the dispenser 1. Each bracket is angled sufficiently to retain the skewer 8 and includes bearing means for bearing the weight of skewers 8 such as roller bearings 35 in the vertex of the angles. As best seen in FIG. 3, the common housing 25 suitably includes a ramp 37 or similar gravity conveying means for conveying the material discharged from the dispenser 1 to the receiving brackets 36 disposed on the belt 31. As best seen in FIG. 7, the endless conveyor system of the invention further includes rotating means for rotating the skewers 8 carried by the brackets 36 as the belts 31 move past the cooking elements 28. The rotating means comprises a rack gear 38 in cooperation with biasing means for biasing the belt 31 toward the rack gear 38 such as plurality of spring-biased roller arms 39 pivotally secured to a section of the housing 25. The biasing action of the roller arms 39 positively engages the skewers 8 with the rack gear 38 against the bearings 35, causing rotation of the skewer 8 and the associated food article as the endless belt 31 is driven by the sprockets 33. It is essential that the bearing means be provided for bearing the weight of the skewer 8 on the bracket 36. Without such bearing means, the skewer will not be rotated, or will be rotated only erratically, and the product will not be properly cooked.

Figure 12:
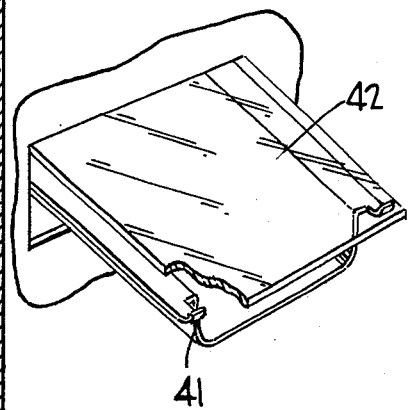
FIG. 12 is a perspective view of a detail of the apparatus of FIGS. 1, 2, 3, and 8.

As best seen in FIG. 3, as the endless belt 31 moves over the upper sprocket 33, the associated bracket 36 is inverted, and the skewered food product is dispensed through a discharge chute 41 in the common housing 25. As best seen in FIG. 12, the chute 41 is preferably equipped with a "sneeze guard" 42 for sanitary reasons.

Figure 8:
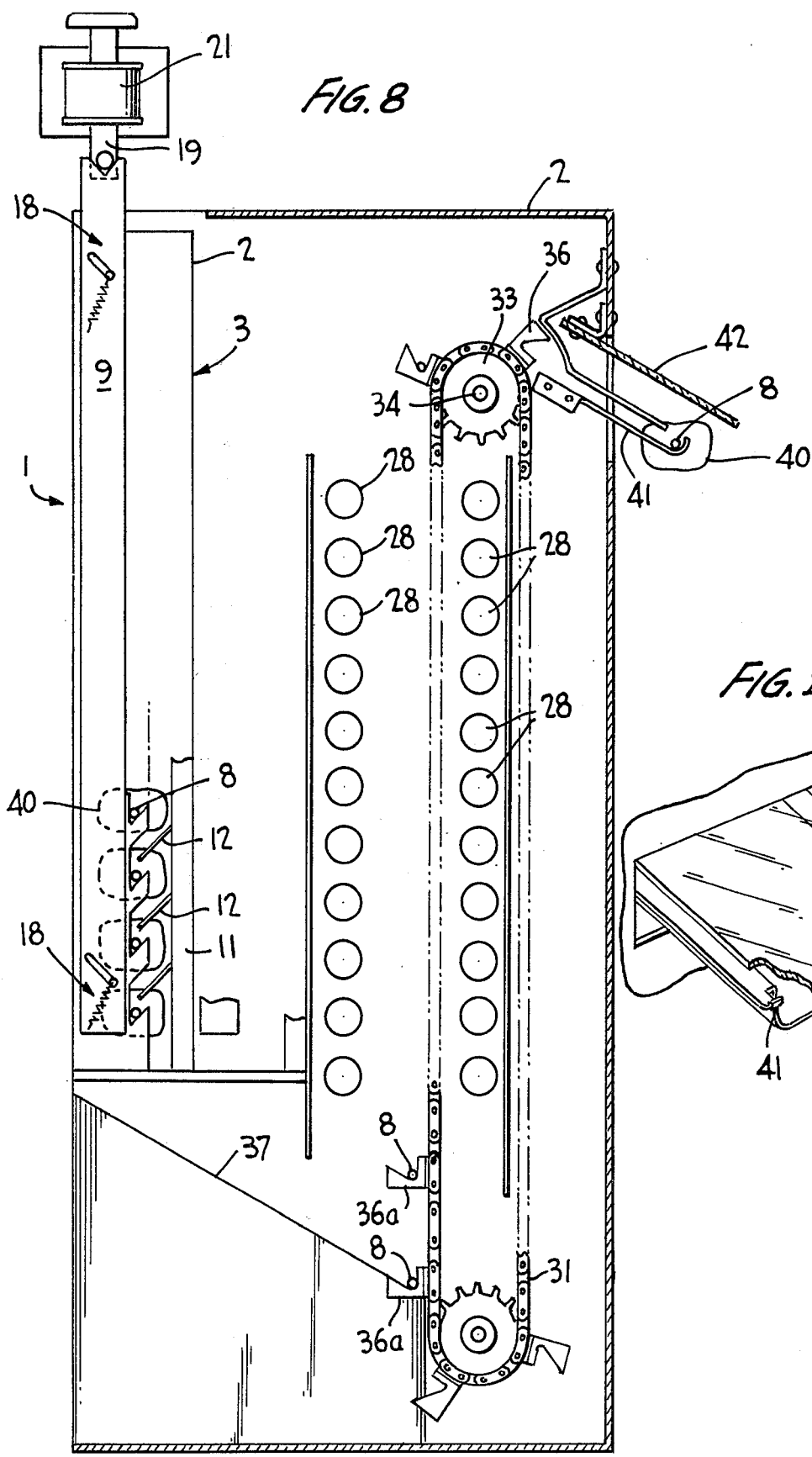
FIG. 8 is a cross-sectional side view of an alternate embodiment of the apparatus of FIG. 3.

A modification of the embodiment of FIGS. 3 and 7, particularly suitable for food items such as skewered buns 40, which do not require rotation for adequate cooking, is illustrated in FIG. 8. In this embodiment, a cooking assembly 27a includes a similar endless belt 31 driven by sprockets 33 which conveys skewered food discharged from the dispenser 1 past a double array of cooking elements 28. The cooking elements 28 are disposed in spaced vertical arrays parallel to the dispensing cartridge 3 so that dispensed food picked up by receiving brackets 36a disposed on belt 31 is carried between the two arrays of cooking elements 28. In this embodiment, no provision is made for rotation of the skewered food carried by brackets 36a, and the brackets 36a accordingly are not provided with the bearings 35 illustrated in the embodiment of FIG. 7. In the embodiment of FIG. 8, skewered food is dispensed through discharge chute 41 as previously described, on passing over the uppermost sprocket 33. In both the embodiments of FIGS. 3 and 8, a fan 43 driven by motor 45 (FIGS. 1 and 2) may be provided for the cooking assembly 27 to assist in the evacuation of vaporized water and grease particles. However, in the embodiment of FIG. 8, a fan will not be required for some cooking operations, for example, bun warming.

As best seen in FIGS. 1 and 2, the common housing 25 for the dispenser 1 and cooking assembly 27 may include either a top access 44 (FIG. 1) or side access 46 (FIG. 2) for insertion of cartridges 3. FIG. 13 is a detailed illustrated of the top access apparatus of FIG. 1 associated with the actuating means of FIGS. 5 and 6. In FIGS. 1 and 2, the dispenser 1 is shown employed with both a cooking assembly 27 of FIG. 3 and a cooking assembly 27a of FIG. 8, suitable for cooking hot dogs and warming buns.

In operation, one or more filled dispensing cartridges 3 are placed in the dispenser 1. To dispense skewered hot dog 7a, the lever solenoids 21 or 21a are energized to activate the levers 19, which in turn actuate the push bars 9 to displace the skewers 8 from the notches 6 in the vertical side members 5. The pins 12 of the guide means then direct each of the skewers 8 holding hot dogs 7 to the next subjacent notches 6; the lowermost pins 12 direct the skewers 8 holding hot dog 7a through the outlet 13 in the cartridge 3 and the opening 14 in the floor of the housing 2. If the opening 14 is provided with a door 16, a door solenoid 21b is activated to open door 16 to dispense the hot dog 7a. If a dispenser 1 is employed with a cooking assembly 27, the skewered hot dog 7a proceeds down ramp 37 to the endless conveyor means 29, where the skewers 8 are picked up by a pair of brackets 36 on endless belts 31. As the belts 31 are driven by the sprockets 33, the skewers 8 are positively engaged between the bearings 35 on the brackets 36 and the rack gear 38 by the action of the roller arms 39 urging the belts 31 toward the rack gear 38, and are caused to rotate as the hot dog 7a passes the cooking elements 28. As the belts 31 travel over uppermost sprockets 33, the brackets 36 are inverted, and the cooked hot dog 7a is discharged onto discharge chute 41 and dispensed.

What is claimed is:

1. Apparatus for heating and dispensing food articles supported on elongated skewers, said apparatus comprising:

conveyor means defining an elongated path of travel between skewer receiving and discharging stations, said conveyor means including a pair of endless conveyors spaced transversely from each other relative to the length dimension of said path;

driving means operatively associated with said conveyor means for moving said endless conveyor along said path;

heating means disposed adjacent said path;

a plurality of skewer support means secured on and spaced longitudinally along each endless conveyor, each skewer support means on one of said conveyors being paired and transversely aligned with a skewer support means on the other of said conveyors, each skewer support means comprising a bracket member having a closed end for loosely carrying a skewer portion while travelling along said path and an open end which is sufficiently wider than the thickness dimension of said skewer portion to freely receive said skewer portion when the skewer portion is dropped into said bracket member at said receiving station and to permit the received skewer portion to drop freely of its own weight from the bracket member at said discharging station;

wherein said bracket members are oriented on said conveyors such that said open end is directed generally upward when passing said receiving station and generally downward when passing said discharging station; and means for continuously rotating said skewers in said bracket members as said skewers travel along said path, said means for continuously rotating comprising an elongated gear track disposed adjacent said path in direct contact with skewers location intermediate said endless conveyors;

wherein said means for continuously rotating further comprises at least two spaced roller bearings in each bracket member for rotatably supporting the skewer portion received in the bracket member, and means continuously urging said bracket members in said path toward said elongated gear track to positively engage supported skewers with said gear track.

2. The apparatus according to claim 1 wherein said heating means comprises a plurality of individual heating elements disposed in spaced alignment along a dimension parallel to said path.

3. The apparatus according to claim 1 wherein said elongated path extends substantially vertically throughout most of its length.

4. Apparatus for heating and dispensing food articles supported on elongated skewers, said apparatus comprising:

conveyor means defining an elongated path of travel between skewer receiving and discharging stations, said conveyor means including a pair of endless conveyors spaced transversely from each other relative to the length dimension of said path;

driving means operatively associated with said conveyor means for moving said endless conveyor along said path;

heating means disposed adjacent said path;

a plurality of skewer support means secured on and spaced longitudinally along each endless conveyor, each skewer support means on one of said conveyors being paired and transversely aligned with a skewer support means on the other of said conveyors, each skewer support means comprising a bracket member having a closed end for loosely carrying a skewer portion while travelling along said path and an open end which is sufficiently wider than the thickness dimension of said skewer portion to freely receive said skewer portion when the skewer portion is dropped into said bracket member at said receiving station and to permit the received skewer portion to drop freely of its own weight from the bracket member at said discharging station;

wherein said bracket members are oriented on said conveyors such that said open end is directed generally upward when passing said receiving station and generally downward when passing said discharging station;

wherein each of said bracket members includes a pair of edges which mutually diverge from said closed end toward said open end; and means for continuously rotating said skewers in said bracket members as said skewers are carried along said path, said means for continuously rotating comprising;

an elongated gear track disposed adjacent said path;

at least two spaced roller bearings secured in each bracket member for rotatably supporting the received skewer portion; and means continuously urging the bracket members disposed in said path toward said elongated gear track to positively engage the supported skewers in direct contact with the gear track at a skewer location intermediate the bracket members.

5. Apparatus for heating and dispensing food articles supported on elongated skewers having an elongated, smooth support portion of substantially constant thickness on which at least one food article is supported, said apparatus comprising:

conveyor means defining an elongated path of travel between skewer receiving and discharging stations, said conveyor means comprising a pair of endless conveyors spaced transversely from each other relative to the length dimension of the path;

driving means operatively associated with said conveyor means for moving said endless conveyors along said path;

heating means disposed adjacent said conveyor means along said path;

a plurality of skewer support means spaced longitudinally along each endless conveyor, each skewer support means on one of said conveyors being paired and transversely aligned with a skewer support means on the other of said conveyors, wherein each skewer support means comprises a bracket member having bearing means for rotatably supporting a portion of a skewer while travelling along said path and skewer receiving means extending from said receiving station and permitting the received skewer portion to freely fall onto said bearing means; and means for continuously rotating said skewers in said bearing means as said skewers travel along said path, said means for continuously rotating comprising a rack gear disposed adjacent and in substantially parallel spaced relation with said path, and means continuously urging said bracket members toward said rack gear to positively and directly engage the elongated smooth support portion of each skewer in said path with said rack gear.

6. The apparatus according to claim 5 wherein said bearing means comprises at least two spaced roller bearings secured bracket members for rotatably supporting the support portion of a received skewer.

* * * * *